(12) United States Patent
Terwilliger

(10) Patent No.: US 6,721,664 B1
(45) Date of Patent: Apr. 13, 2004

(54) MAXIMUM LIKELIHOOD DENSITY MODIFICATION BY PATTERN RECOGNITION OF STRUCTURAL MOTIFS

(75) Inventor: Thomas C. Terwilliger, Sante Fe, NM (US)

(73) Assignee: The Regents of the University of California, Los Alamos, NM (US)

( * ) Notice: Subject to any disclaimer, the term of this patent is extended or adjusted under 35 U.S.C. 154(b) by 118 days.

(21) Appl. No.: 09/769,612

(22) Filed: Jan. 23, 2001

Related U.S. Application Data

(63) Continuation-in-part of application No. 09/512,962, filed on Feb. 25, 2000.
(60) Provisional application No. 60/206,513, filed on May 22, 2000.

(51) Int. Cl.$^7$ .......................... G01N 33/48; G01N 31/00; G06G 7/48; G06G 7/58
(52) U.S. Cl. .............................. 702/19; 702/27; 703/11; 703/12
(58) Field of Search ....................... 702/19, 27; 703/11, 703/12

(56) References Cited

PUBLICATIONS

Szoke A. Holographic microscopy with a complicated reference. Journal of Information Science and Technology, vol. 41, 332–341, 1997.*
Szoke, "Holographic Methods in X–ray Crystallography, II, Detailed Theory and Connection to Other Methods of Crystallography," Acta Cryst., (1993), A49, 853–866.
Maalouf, "Holographic Methods in X–ray Crystallography, III. First Numerical Results," Acta Cryst., (1993), A49, 866–871.
Kevin D. Cowtan et al., "Improvement of Macromolecular Electron–Density Maps by the Simultaneous Application of Real and Reciprocal Space Constraints," International Union of Crystallography, D429, pp. 148–157, 1993.
Beran, "Simulated Annealing for Phasing using Spatial Constraints," Acta Cryst., (1995), A51, 20–27.
Szoke et al., "Holographic Methods in X–ray Crystallography, IV. A Fast Algorithm and its Application to Macromolecular Crystallography," Acta Cryst., (1995), A51, 691–708.
Szoke et al., "Holographic Methods in X–ray Crystallography, V. Multiple Isomorphous Replacement, Multiple Anomalous Dispersion and Non–crystallographic Symmetry," Acta Cryst., (1997), A53, 291–313.
Szoke, "Use of Statistical Information in X–ray Crystallography with Application to the Holographic Method," Acta Cryst., (1998), A54, 543–562.
Bi–Cheng Wang, "Resolution of Phase Ambiguity in Macromolecular Crystallography," Methods in Enzymology, vol. 115, pp. 90–113, 1985.
Shibin Xiang et al., "Entropy Maximization Constrained by Solvent Flatness: a New Method for Macromolecular Phase Extension and Map Improvement," International Union of Crystallography, D49, pp. 193–212, 1993.
G. Bricogne, "Maximum Entropy and the Foundations of Direct Methods," International Union of Crystallography, A40, pp. 410–445, 1984.
G. Bricogne, A Bayesian Statistical Theory of the Phase Problem. 1. A Multichannel Maximum–Entropy Formalism for Constructing Generalized Joint Probability Distribution of Structure Factors, A44, pp. 517–545, (1988).
Thomas C. Terwilliger et al., "Automated MAD and MIR Structure Solution", International Union of Crystallography, D55, pp. 849–861, (1999).
V. Yu. Lunin "Electron–Density Histograms and the Phase Problem," International Union of Crystallography, D49, pp. 90–99, (1993).

* cited by examiner

Primary Examiner—John S. Brusca
Assistant Examiner—Shubo (Joe) Zhou
(74) Attorney, Agent, or Firm—Ray G. Wilson

(57) ABSTRACT

An electron density for a crystallographic structure having protein regions and solvent regions is improved by maximizing the log likelihood of a set of structures factors $\{F_h\}$ using a local log-likelihood function:

$$LL(\rho(x, \{F_h\}))=\ln[p(\rho(x)|\text{PROT})p_{PROT}(x)+p(\rho(x)|\text{SOLV})p_{SOLV}(x)+p(\rho(x)|H)p_H(x)],$$

where $p_{PROT}(x)$ is the probability that x is in the protein region, $p(\rho(x)|\text{PROT})$ is the conditional probability for $\rho(x)$ given that x is in the protein region, and $p_{SOLV}(x)$ and $p(\rho(x)|\text{SOLV})$ are the corresponding quantities for the solvent region, $p_H(x)$ refers to the probability that there is a structural motif at a known location, with a known orientation, in the vicinity of the point x; and $p(\rho(x)|H)$ is the probability distribution for electron density at this point given that the structural motif actually is present. One appropriate structural motif is a helical structure within the crystallographic structure.

5 Claims, 4 Drawing Sheets

MAXIMUM LIKELIHOOD DENSITY MODIFICATION BY PATTERN RECOGNITION OF STRUCTURAL MOTIFS

RELATED APPLICATIONS

This application claims the benefit of U.S. provisional patent application Ser. No. 60/206,513, filed May 22, 2000; and is a continuation-in-part of U.S. patent application Ser. No. 09/512,962, filed Feb. 25, 2000.

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to the determination of crystal structure from the analysis of diffraction patterns, and, more particularly, to identification of protein crystal structure represented by electron density patterns.

BACKGROUND OF THE INVENTION

The determination of macromolecular structures, e.g., proteins, by X-ray crystallography is a powerful tool for understanding the arrangement and function of such macromolecules. Very powerful experimental methods exist for determining crystallographic features, e.g., structure factors and phases. While the structure factor amplitudes can be determined quite well, it is frequently necessary to improve or extend the phases before a realistic atomic model of the macromolecule, such as an electron density map, can be built.

Many methods have been developed for improving the phases by modifying initial experimental electron density maps with prior knowledge of characteristics expected in these maps. The fundamental basis of density modification methods is that there are many possible sets of structure factors (amplitudes and phases) that are all reasonably probable based on the limited experimental data that is obtained from a particular experiment, and those structure factors that lead to maps that are most consistent with both the experimental data and the prior knowledge are the most likely overall. In these methods, the choice of prior information that is to be used and the procedure for combining prior information about electron density with experimentally-derived phase information are important features.

Until recently, electron density modification-has generally been carried out in a two-step procedure that is iterated until convergence occurs. In the first step, an electron density map is obtained experimentally and then modified in real space in order to make it consistent with expectations. The modification can consist of, e.g., flattening solvent regions, averaging non-crystallographic symmetry-related regions, or histogram-matching. In the second step, phases are calculated from the modified map and are combined with the experimental phases to form a new phase set.

The disadvantage of this real-space modification approach is that it is not clear how to weight the observed phases from those obtained from the modified map. This is because the modified map contains some of the same information as the original map and some new information. This has been recognized for a long time and a number of approaches have been designed to improve the relative weighting from these two sources, including the use of maximum-entropy methods, the use of weighting optimized using cross-validation, and "solvent-flipping."

A comprehensive theory of the phase problem in X-ray crystallography and a formalism for solving it based on maximum entropy and maximum likelihood methods has been presented by Bricogne, Acta Cryst. A40, pp. 410–445 (1984) and Bricogne, Acta Cryst. A44, pp. 517–545 (1988). This formalism describes the contents of a crystal in terms of a collection of point atoms along with probabilities for their positions. From the positions of these atoms, crystallographic structure factors can be calculated, with a certainty depending on the certainties of the positions of the atoms. Extensions of the formalism are described in Bricogne (1988). The extended formalism specifically addresses the situation encountered in crystals of macromolecules in which defined solvent and macromolecule regions exist in the crystallographic unit cell, and formulas for calculating probabilities of structure factors based on the presence of "flat" solvent regions are presented (Bricogne, 1988). The implementation of this formalism is not straightforward according to Xiang et al., Acta Cryst. D49, pp. 193–212 (1993), who point out that a full fledged implementation of this approach would be highly desirable and would provide a statistical technique for enforcing solvent flatness in advance. Xiang et al. (1993) report that they settled for an approximation in which solvent flatness outside the envelope is imposed after the calculation of a model for the distribution of atoms, which corresponds to the existing procedure of flattening the solvent in an electron density map (Wang, Methods Enzymol. 115, pp. 90–112 (1985)).

Somoza, et al., Acta Cryst. A51, pp. 691–708 (1995) describe an algorithm for recovering crystallographic phase information that is related to the method of Bricogne (1988), but in which electron density is estimated by minimizing a combined target function consisting of the weighted sum of two terms. One term is the weighted sum of squares of differences between calculated and known electron density in the region where electron density is known. The other term is the weighted sum of squares of differences between calculated and observed amplitudes of structure factors. In this method, the electron density in a model description of the crystal is adjusted in order to minimize the combined target function. The use of the first term was shown by Somoza et al (1995) to correspond to the solvent flattening procedures described above. This allowed solvent flattening and other related density modification procedures (such as non-crystallographic symmetry averaging) to be carried out without the iterative phase recombination steps required in previous methods. Beran and Szoke, Acta Cryst A51, pp. 20–27 (1995) describe a procedure for finding crystallographic phases that lead to an electron density map that matches known electron density within a target region. This procedure consists of minimizing a target function given by the squared difference between calculated and known electron density within the target region, by adjusting crystallographic phases and using observed amplitudes. The method was shown to be superior to difference Fourier methods and the improvement was attributed to the ability of the method to specify the uncertainties in electron density in different physical regions of the unit cell of the crystal.

The present invention solves the same problem that earlier procedures proposed by Bricogne (1988) address, and also includes the use of likelihood as a basis for choosing optimal crystallographic structure factors. The assumptions used in the present procedure differ substantially from those used by Bricogne (1988). For treatment of solvent and macromolecule (protein) regions in a crystal, Bricogne develops statistical relationships among structure factors based on a model of the contents of the crystal in which point atoms are randomly located, but in which atoms in the protein region are sharply-defined with low thermal parameters and atoms in the solvent region are diffuse, with high thermal parameters. In the present approach, no assumptions about the presence of atoms or possible values of thermal factors are used. Instead, it is assumed that values of electron density in the protein and solvent regions, respectively, are distributed in the same way in the crystal as in a model calculation of a crystal that may or may not be composed of discrete atoms.

The methods used to find likely solutions to the phase problem are also very different in the present approach compared to that of Bricogne (1988) because the assumptions used require the problem to be set up in different ways. Bricogne (1988) applies a maximum-entropy formalism developed by Bricogne (1984) to find likely arrangements of atoms in the crystal, which in turn can be used to calculate the arrangement of electron density in the crystal. In the present method, likely values of the structure factors are found by applying a likelihood-based approach based on a combination of experimental information and the likelihood of resulting electron density maps. These structure factors can be used to calculate an electron density map that is then, in turn, a likely arrangement of electron density in the crystal.

The present invention also addresses much the same problem that earlier procedures by Somoza et al. (1995) address. However the present invention differs considerably in the way that it is formulated, and consequently in the way that a solution is obtained. In particular, the approaches are different because Somoza et al (1995) use electron density as the independent variable and the present method uses crystallographic phases, generally fixing amplitudes to measured values. In the method of Somoza et al., (1995), the range of possible combinations of amplitudes and phases of structure factors that is explored is the set of all those that correspond to all or a subset of arrangements of positive electron density in the map, while in the present invention it is all possible crystallographic phases in combination with observed amplitudes. Consequently the two methods sample different possible combinations of amplitudes and phases of crystallographic structure factors.

The mathematical approaches for obtaining solutions in the two methods are different as well. The method of Somoza et al. (1995) calculates derivatives of their target function with respect to electron density, resulting in a linear system of equations to solve for the electron density at all points in the electron density map, while the present invention calculates derivatives of a likelihood-based target function with respect to structure factors in order to solve for crystallographic phases (or phases and amplitudes if amplitudes are not measured).

Finally, the target function that is optimized in the method of Somoza et al. (1995) is a weighted sum of squared differences, while the target function in the present invention is a log-likelihood-based function. The target function in Somoza et al (1995) simply restrains the electron density in the region where it is known to be similar to the known values. The present invention instead calculates the log-likelihood of the electron density map and maximizes it. Consequently the weighting schemes and the details of the target functions used are different.

The method of Beran and Szoke (1995) is related to the present method in that their target function has the same form as a special case of the map log-likelihood function to be described below, in which the local map log-likelihood is zero for all points outside the target area and a constant for all points within it. The method of Beran and Szoke differs in several ways from the present invention. First, as in the method of Somoza et al (1995), the target function is a weighted sum of squared differences, while the target function in the present case is a log-likelihood-based function. Second, in the method of Beran and Szoke (1995), no terms corresponding to agreement of phases with experimental observations are considered, while in the present method, these are a key source of phase information. Finally, the method of Beran and Szoke (1995) differs from the present method in that the means used to minimize the target function is based on simulated annealing (a method for sequentially adjusting phases in a biased, but random, walk, choosing those that improve the target function), contrasted with the approach of the present invention of calculating gradients of likelihood-based target function with respect to phases.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

An electron density map for a crystallographic structure having protein regions and solvent regions is improved by maximizing the log likelihood of a set of structures factors $\{F_h\}$ using a local log-likelihood function:

$$LL(\rho(x, \{F_h\}))=\ln[p(\rho(x)|\text{PROT})p_{PROT}(x)+p(\rho(x)|\text{SOLV})p_{SOLV}(x)+p(\rho(x)|H)p_H(x)],$$

where $p_{PROT}(x)$ is the probability that x is in the protein region, $p(\rho(x)|\text{PROT})$ is the conditional probability for $\rho(x)$ given that x is in the protein region, and $p_{SOLV}(x)$ and $p(\rho(x)|\text{SOLV})$ are the corresponding quantities for the solvent region, $p_H(x)$ refers to the probability that there is a structural motif at a known location, with a known orientation, in the vicinity of the point x; and $p(\rho(x)|H)$ is the probability distribution for electron density in the vicinity of point x, given that the structural motif actually is present.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

Figure 1:
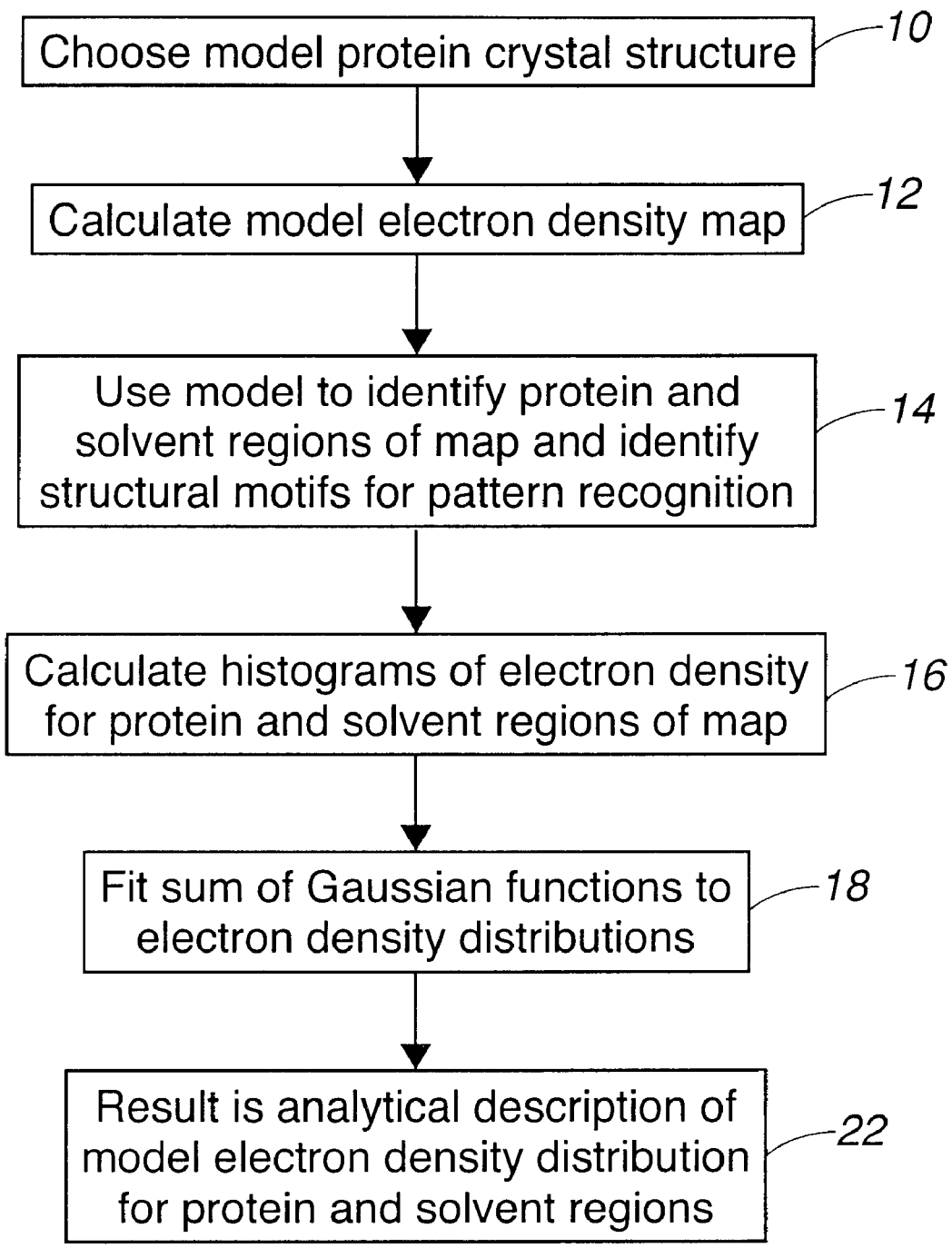
FIG. 1 is a flow sheet for a process to obtain characteristics from a model electron density map.

In accordance with the present invention, experimental phase information is combined with prior knowledge about expected electron density distribution in maps by maximizing a combined likelihood function. The fundamental idea is to express knowledge about the probability of a set of structure factors $\{F_h\}$ ($F_h$ includes amplitude, $F_h$, and phase, $\phi$, factors) and in terms of three quantities: (1) any prior knowledge available from other sources about these structure factors, (2) the likelihood of having measured the observed set of structure factors $\{F_h^{OBS}\}$ if this structure factor set $\{F_h\}$ were correct; and (3) the likelihood that the map resulting from this structure factor set $\{F_h\}$ is consistent with prior knowledge about the structure under observation and other macromolecular structures. The index factor h is defined in terms of the hkl indices and unit vectors a*, b*, c* in reciprocal lattice space as h=ha*+kb*+lc*.

When formulated in this manner, the overlap of information that occurred in the real-space modification methods is not present because the experimental and prior information are kept separate. Consequently, proper weighting of experimental and prior information only requires estimates of probability functions for each source of information.

The likelihood-based density modification approach has a second very important advantage. This is that the derivatives of the likelihood functions with respect to individual structure factors can be readily calculated in reciprocal space by Fast Fourier Transform (FFT) based methods. As a consequence, density modification simply becomes an optimization of a combined likelihood function by adjustment of structure factors. This makes density modification a remarkably simple but powerful approach, requiring only that suitable likelihood functions be constructed for each aspect of prior knowledge that is to be incorporated.

The basic idea of the likelihood-based density modification procedure is that there are two key kinds of information about the structure factors for a crystal of a macromolecule. The first is the experimental phase and amplitude information, which can be expressed in terms of a likelihood (or a long-likelihood function $LL^{OBS}(F_h)$ for each structure factor $F_h$. The experimental probability distribution for the structure factor, $p^{OBS}(F_h)$ is given by $$p^{OBS}(F_h) = \exp\{LL^{OBS}(F_h)\} \quad (1)$$

For reflections with accurately-measured amplitudes, the chief uncertainly in $F_h$ will be in the phase, while, for unmeasured or poorly-measured reflections, it will be in both phase and amplitude.

The second kind of information about structure factors in this formulation is the likelihood of the map resulting from the factors. For example, for most macromolecular crystals, a set of structure factors $\{F_h\}$ that leads to a map with a flat region corresponding to solvent is more likely to be correct than one that leads to a map with uniform variation everywhere. This map likelihood function describes the probability that the map obtained from a set of structure factors is compatible with expectations:

$$p^{MAP}(F_h) = \exp\{LL^{MAP}(F_h)\} \quad (2)$$

The two principal sources of information are then combined, along with any prior knowledge of the structure factors, to yield the likelihood of a particular set of structure factors:

$$LL(\{F_h\}) = LL^0(\{F_h\}) + LL^{OBS}(\{F_h\}) + LL^{MAP}(\{F_h\}) \quad (3)$$

where $LL^0(\{F_h\})$ includes any structure factor information that is known in advance, such as the distribution of intensities of structure factors.

In order to maximize the overall likelihood function in Eq. (3), the change in the map likelihood function in response to changes in structure factors must be known. In the case of the map likelihood function, $LL^{MAP}(\{F_h\})$, there are two linked relationships: the response of the likelihood function to changes in electron density, and the changes in electron density as a function of changes in structure factors. In principle, the likelihood of a particular map is a complicated function of the electron density over the entire map. Furthermore, the value of any structure factor affects the electron density everywhere in the map.

For simplification, a low-order approximation to the likelihood function for a map is used instead of attempting to evaluate the function precisely. As Fourier transformation is a linear process, each reflection contributes independently to the electron density at a given point in the cell. Although the log-likelihood of the electron density might have any form, it is expected that, for sufficiently small changes in structure factors, a first-order approximation to the log-likelihood function would apply and each reflection would also contribute relatively independently to changes in the log-likelihood function.

Consequently, a local approximation to the map likelihood function can be constructed, neglecting correlations among different points in the map and between reflections, expecting that it might describe with reasonable accuracy how the likelihood function would vary in response to small changes in the structure factors. By neglecting correlations among different points in the map, the log-likelihood for the whole electron density map is written as the sum of the log-likelihood of the densities at each point in the map, normalized to the volume of the unit cell and the number of reflections used to construct it:

$$LL^{MAP}(\{F_h\}) \approx \frac{N_{REF}}{V} \int_V LL(\rho(x, \{F_h\})) d^3x \quad (4)$$

where $N_{REF}$ is the number of independent reflections and V is the volume.

By treating each reflection as independently contributing to the likelihood function, a local approximation to the log-likelihood of the density at each point $LL(\rho(x, \{F_h\}))$ is written. This approximation is given by the sum over all reflections of the first few terms of a Taylor's series expansion around the value obtained with the starting structure factors $\{F_h^0\}$ used in a cycle of density modification, $$LL(\rho(x, \{F_h\})) \approx LL(\rho(x, \{F_h^0\})) + \sum_h \left[ \right.$$

$$\Delta F_{h,\parallel} \frac{\partial}{\partial F_{h,\parallel}} LL(\rho(x, \{F_h\})) + \frac{1}{2} \Delta F_{h,\parallel}^2 \frac{\partial^2}{\partial F_{h,\parallel}^2} LL(\rho(x, \{F_h\})) \Delta F_{h,\perp}$$

$$\frac{\partial}{\partial F_{h,\perp}} LL(\rho(x, \{F_h\})) + \frac{1}{2} \Delta F_{h,\perp}^2 \frac{\partial^2}{\partial F_{h,\perp}^2} LL(\rho(x, \{F_h\})) + \ldots \left. \right];$$

(5)

where $\Delta F_{h,\parallel}$ and $\Delta F_{h,\perp}$ are the differences between $F_h$ and $F_h^0$ along the directions $F_h^0$ and $iF_h^0$, respectively.

Combining Eqs. (4) and (5) results in an expression for the map log-likelihood function, $$LL^{MAP}(\{F_h\}) \approx \quad (6)$$

$$LL^{MAP}(\rho(x, \{F_h^0\})) + \frac{N_{REF}}{V} \sum_h \left[ \Delta F_{h,\parallel} \int_V \frac{\partial}{\partial F_{h,\parallel}} LL(\rho(x, \{F_h\})) d^3x + \right.$$

$$\frac{1}{2}\Delta F_{h,\parallel}^2 \int_V \frac{\partial}{\partial F_{h,\parallel}^2} LL(\rho(x,\{F_h\})) d^3x +$$

$$\Delta F_{h,\perp} \int_V \frac{\partial}{\partial F_{h,\perp}} LL(\rho(x,\{F_h\})) d^3x +$$

$$\frac{1}{2}\Delta F_{h,\perp}^2 \int_V \frac{\partial}{\partial F_{h,\perp}^2} LL(\rho(x,\{F_h\})) d^3x + \dots \Bigg]$$

The integrals in Eq. (6) can be rewritten in a form that is suitable for evaluation by a FFT-based approach. Considering the first integral in Eq. (6), use the chain rule to write, $$\frac{\partial}{\partial F_{h,\parallel}} LL(\rho(x,\{F_h\})) = \frac{\partial}{\partial \rho(x)} LL(\rho(x,\{F_h\})) \frac{\partial}{\partial F_{h,\parallel}} \rho(x) \quad (7)$$

and note that the derivative of $\rho(x)$ with respect to $F_{h,\parallel}$ for a particular index value h is given by, $$\frac{\partial}{\partial F_{h,\parallel}} \rho(x) = \frac{2}{V} \text{Re}[e^{i\phi_h - 2\pi i h \cdot x}] \quad (8)$$

Now the first integral in Eq. (6) is rewritten in the form, $$\int_V \frac{\partial}{\partial F_{h,\parallel}} LL(\rho(x,\{F_h\})) d^3x = \frac{2}{V} \text{Re}[e^{i\phi_h} a_h^*] \quad (9)$$

where the complex number $a_h$ is a term in the Fourier transform of $$\frac{\partial}{\partial \rho(x)} LL(\rho(x,\{F_h\})), \quad a_h = \int_V LL(\rho(x,\{F_h\})) e^{2\pi i h \cdot x} d^3x \quad (10)$$

In space groups other than P1, only a unique set of structure factors needs to be specified to calculate an electron density map. Taking space group symmetry into account, Eq. (9) can be generalized to read, $$\int_V \frac{\partial}{\partial F_{h,\parallel}} LL(\rho(x,\{F_h\})) d^3x = \frac{2}{V} \sum_{h'} \text{Re}[e^{i\phi_h} a_{h'}^*] \quad (11)$$

where the indices h' are all indices equivalent to h due to space-group symmetry.

A similar procedure is used to rewrite the second integral in Eq. (6), yielding the expression, $$\int_V \frac{\partial}{\partial F_{h,\parallel}^2} LL(\rho(x,\{F_h\})) d^3x = \quad (12)$$

$$\frac{2}{V^2} \sum_{h',k'} \text{Re}[e^{i\phi_{h'}} e^{i\phi_{k'}} b_{h'-k'} + e^{-i\phi_{h'}} e^{-i\phi_{k'}} b_{h'+k'}]$$

where the indices h' and k' are each all indices equivalent to h due to space group symmetry, and where the coefficients $b_h$ are again terms in a Fourier transform, this time the second derivative of the log-likelihood of the electron density, $$b_h = \int_V \frac{\partial^2}{\partial^2 \rho(x)^2} LL(\rho(x,\{F_h\})) e^{2\pi i h \cdot x} d^3x \quad (13)$$

The third and fourth integrals in Eq. (6) can be rewritten in a similar way yielding the expressions, $$\int_V \frac{\partial}{\partial F_{h,\perp}} LL(\rho(x,\{F_h\})) d^3x = \frac{2}{V} \sum_{h'} \text{Re}[ie^{i\phi_{h'}} a_{h'}^*] \text{ and} \quad (14)$$

$$\int_V \frac{\partial}{\partial F_{h,\perp}^2} LL(\rho(x,\{F_h\})) d^3x = \quad (15)$$

$$\frac{2}{V^2} \sum_{h',k'} \text{Re}[e^{-i\phi_{h'}} e^{i\phi_{k'}} b_{h'-k'} - e^{-i\phi_{h'}} e^{-i\phi_{k'}} b_{h'+k'}]$$

The significance of Eqs. (4) through (15) is that there is now a simple expression (Eq. (6)) describing how the map likelihood function $LL^{MAP}(\{F_h\})$ varies when small changes are made in the structure factors. Evaluating this expression requires only that the first and second derivatives of the log-likelihood of the electron density be calculated with respect to electron density at each point in the map (see Eq. (22) below) and that a Fast Fourier Transform (FFT) be carried out as described by Teneyck, Acta Cryst. D55, pp. 1863–1871 (1999), incorporated by reference. Furthermore, maximization of the (local) overall likelihood function (Eq. (3)) becomes straightforward, as every reflection is treated independently. It consists simply of adjusting each structure factor to maximize its contribution to the approximation to the likelihood function through Eqs. (3)–(15).

In practice, instead of directly maximizing the overall likelihood function, it is used here to estimate the probability distribution for each structure factor, and then to integrate this probability distribution over the phase (or phase and amplitude) of the reflection to obtain a weighted mean estimate of the structure factor. Using Eqs. (3)–(15), the probability distribution for an individual structure factor can be written as, $$\ln p(F_h) \approx LL^0(F_h) + LL^{OBS}(F_h) + \frac{2N_{REF}}{V^2} \Delta F_{h,\parallel} \sum_{h'} \text{Re}[e^{i\phi_{h'}} a_{h'}^*] + \quad (16)$$

$$\frac{2N_{REF}}{V^3} \Delta F_{h,\parallel}^2 \sum_{h',k'} \text{Re}[e^{-i\phi_{h'}} e^{i\phi_{k'}} b_{h'-k'} + e^{-i\phi_{h'}} e^{-i\phi_{k'}} b_{h'+k'}] +$$

$$\frac{2N_{REF}}{V^2} \Delta F_{h,\perp} \sum_{h'} \text{Re}[ie^{i\phi_{h'}} a_{h'}^*] +$$

$$\frac{2N_{REF}}{V^3} \Delta F_{h,\perp}^2 \sum_{h',k'} \text{Re}[e^{-i\phi_{h'}} e^{i\phi_{k'}} b_{h'-k'} - e^{-i\phi_{h'}} e^{-i\phi_{k'}} b_{h'+k'}]$$

where, as above, the indices h' and k' are each all indices equivalent to h due to space group symmetry, and the coefficients $a_h$ and $b_h$ are given in Eqs. (10) and (13). Also, as before, $\Delta F_{h,\parallel}$ and $\Delta F_{h,\perp}$ are the differences between $F_h$ and $F_h^0$ along the directions $F_h^0$ and $iF_h^0$, respectively. All the quantities in Eq. (16) can be readily calculated once a likelihood function for the electron density and its derivatives are obtained (see Eq. (22) below).

A key step in likelihood-based density modification is the decision as to the likelihood function for values of the electron density at a particular location in the map. For the present purposes, an expression for the log-likelihood of the electron density $LL(\rho(x,\{F_h\}))$ at a particular location x in a map is needed that depends on whether the point satisfies any of a wide variety of conditions, such as being in the protein or solvent region of the crystal, being at a certain location in a known fragment of structure, being at a certain distance from some other feature of the map, or the like. Information can be incorporated on the environment of x by writing the log-likelihood function as the log of the sum of conditional probabilities dependent on the environment of x, $$LL(\rho(x,\{F_h\}))=\ln[p(\rho(x)|PROT)p_{PROT}(x)+ p(\rho(x)|SOLV)p_{SOLV}(x)] \quad (17)$$

where $p_{PROT}(x)$ is the probability that x is in the protein region and $p(\rho(x)|PROT)$ is the conditional probability for $\rho(x)$ given that x is in the protein region, and $p_{SOLV}(x)$ and $p(\rho(x)|SOLV)$ are the corresponding quantities for the solvent region. The probability that x is the protein or solvent region is estimated by a modification, described in Terwilliger, Acta Cryst. D55, pp. 1863–1871 (1999), of the methods described in Wang, Methods Enzymol. 115, pp. 90–112 (1985), and Leslie, Proceedings of the Study Weekend organized by CCP4, pp. 25–32 (1988), incorporated herein by reference. If there were more than just solvent and protein regions that identified the environment of each point, then Eq. (17) could be modified to include those as well.

In developing Eqs. (3)–(15), the derivatives of the likelihood function for electron density were intended to represent how the likelihood function changed when small changes in one structure factor were made. Surprisingly, the likelihood function that is most appropriate for the present invention is not a globally correct one. Instead, it is a likelihood function that represents how the overall likelihood function varies in response to small changes in one structure factor, keeping all others constant. To see the difference, consider the electron density in the solvent region of a macromolecular crystal. In an idealized situation with all possible reflections included, the electron density might be exactly equal to a constant in this region. The goal in using Eq. (16) is to obtain the relative probabilities for each possible value of a particular unknown structure factor $F_h$. If all other structure factors were exact, then the globally correct likelihood function for the electron density (zero unless the solvent region is perfectly flat) would correctly identify the correct value of the unknown structure factor.

Now suppose the phase information is imperfect. The solvent regions would have a significant amount of noise, and the electron density value is no longer a constant. If the globally correct likelihood function is used for the electron density, a zero probability would be assigned to any value of the structure factor that did not lead to an absolutely flat solvent region. This is clearly unreasonable, because all the other (incorrect) structure factors are contributing noise that exists regardless of the value of this structure factor.

This situation is very similar to the one encountered in structure refinement of macromolecular structures where there is a substantial deficiency in the model. The errors in all the other structure factors in the discussion correspond to the deficiency in the macromolecular model in the refinement case. The appropriate variance to use as a weighting factor in refinement includes the estimated model error as well as the error in measurement. Similarly, the appropriate likelihood function for electron density for use in the present method is one in which the overall uncertainty in the electron density due to all reflections other than the one being considered is included in the variance.

A likelihood function of this kind for the electron density can be developed using a model in which the electron density due to all reflections but one is treated as a random variable. See Terwilliger et al., Acta Cryst. D51, pp. 609–618 (1996), incorporated herein by reference. Suppose that the true value of the electron density at x was known and was given by $\rho_T$. Then consider that there are estimates of all the structure factors, but that substantial errors exist in each one. The expected value of the estimate of this electron density ($\rho_{OBS}$) obtained from current estimates of all the structure factors will be given approximately by $<\rho_{OBS}> = \beta\rho_T$, and the expected value of the variance by $<(\rho_{OBS}-\beta\rho_T)^2> = \sigma^2_{MAP}$. The factor $\beta$ represents the expectation that the calculated value of $\rho$ will be smaller than the true value. This is true for two reasons. One is that such an estimate may be calculated using figure-of-merit weighted estimates of structure factors, which will be smaller than the correct ones. The other is that phase error in the structure factors systematically leads to a bias towards a smaller component of the structure factor along the direction of the true structure factor.

A probability function for the electron density at a point that x that is appropriate for assessing the probabilities of values of the structure factor for one reflection can now be written as, $$p(\rho) = \exp\frac{(\rho - \beta\rho_T)^2}{2\sigma^2_{MAP}} \quad (18)$$

In a slightly more complicated case where the value of $\rho_T$ is not known exactly, but rather has an uncertainly $\sigma_T$, Eq. (18) becomes, $$p(\rho) = \exp\frac{(\rho - \beta\rho_T)^2}{2(\beta^2\sigma^2_T + \sigma^2_{MAP})} \quad (19)$$

Finally, in the case where only a probability distribution $p(\rho_T)$ for $\rho_T$ is known, Eq. (18) becomes, $$p(\rho) = \int_{\rho_T} p(\rho_T)\exp\left\{-\frac{(\rho - \beta\rho_T)^2}{2\sigma^2_{MAP}}\right\}d\rho_T \quad (20)$$

Using Eqs. (19) and (20), a histogram-based approach (Goldstein et al., Acta Cryst. D54, pp. 1230–1244 (1998)) can be used to develop likelihood functions for the solvent region of a map and for the macromolecule-containing region of a map. The approach is simple. The probability distribution for true electron density in the solvent or macromolecule regions of a crystal structure is obtained from an analysis of model structures and represented as a sum of gaussian functions of the form, $$p(\rho_T) = \sum_k w_k \exp\left\{-\frac{(\rho - c_k)^2}{2\sigma^2_k}\right\} \quad (21)$$

where the coefficients $w_k$ are normalized so that the integral of $p(\rho_T)$ is normalized overall $\rho$.

The coefficients $c_k$, $\sigma_k^2$, and $w_k$ are obtained as follows. A model of a protein structure is used to calculate theoretical structure factors for a crystal of that protein structure. Exemplary structures may be obtained from the Protein Data Bank (H. M. Berman et al., The Protein Data Bank. Nucleic Acids Research 28, pp. 235–242, 2000), with data containing space group, cell dimensions and angles, and a list of coordinates, atom types, occupancies, and atomic displacement parameters. The model may be chosen to be similar in size, resolution of the data, and overall atomic displacement factors to the experimental protein structure to be analyzed, but this is not essential to the process. The resolution of the calculated data and the average atomic displacement parameter may be adjusted to match those of the protein structure to be analyzed. Alternatively, a standardized resolution such as 3 Angstrom units and unadjusted atomic displacement parameters may be used, as in the examples given below. The theoretical structure factors for the model are then used to calculate an electron density map.

The electron density map is then divided into "protein" and "solvent" regions in the following way. All points in the map within a specified distance (typically 2.5 Angstrom units) of an atom in the model are designated "protein" and all others are designated "solvent". The next steps are carried out separately for "protein" and "solvent" regions of the electron density map. A histogram of the numbers of points in the protein or solvent region of the electron density map that fall into each possible range of electron densities is calculated. The histogram is then normalized so that the sum of all histogram values is equal to unity. Finally, the coefficients $c_k$, $\sigma_k^2$, and $w_k$ are obtained by least-squares fitting of Equation (21) to the normalized histograms. One set of coefficients is obtained for the "protein" region, another for the "solvent" region.

If the values of $\beta$ and $\sigma_{MAP}$ are known for an experimental map with unknown errors, but identified solvent and protein regions, the probability distribution for electron density in each region of the map can be written approximately from Eq. (19) as, $$p(\rho) = \sum_k w_k \exp\left\{-\frac{(\rho - \beta c_k)^2}{2(\beta^2 \sigma_k^2 + \sigma_{MAP}^2)}\right\} \qquad (22)$$

with the appropriate values of $\beta$ and $\sigma_{MAP}$ and separate values of $c_k$, $\sigma_k^2$, and $w_k$ for protein and solvent regions. In practice, the values of $\beta$ and $\sigma_{MAP}$ are estimated by a least-squares fitting of the probability distributions for protein and solvent regions given in Eq. (22) to the ones found in the protein and solvent regions in the experimental map.

This fitting is carried out by first constructing separate histograms of values of electron density in the protein and solvent regions defined by the methods described in Wang, Methods Enzymol 115, pp. 90–112 (1985) and Leslie, Proceedings of the Study Weekend, organized by CCP4, pp. 25–32 (1988), incorporated by reference. Next, the histograms are normalized so that the sum, over all values of electron density, of the values in each histogram is unity. In this way the histograms represent the probability that each value of electron density is observed. Then the values of $\beta$ and $\sigma_{MAP}$ in Eq. (22) are adjusted to minimize the squared difference between the values of the probabilities calculated from Eq. (22) and the observed values from the analysis of the histogram. This procedure has the advantage that the scale of the experimental map does not have to be accurately determined. Then Eq. (22) is used with the refined values of $\beta$ and $\sigma_{MAP}$ as the probability function for electron density in the corresponding region (solvent or macromolecule) of the map.

The local log-likelihood function for the map in Eq. (17) is based simply on probability distributions for the protein and solvent regions of the map. The same approach can be applied to information on the likely values of electron density at a particular point derived from any other source. In particular, suppose that the probability $p_H$ is known that there is a structural motif, e.g., a helix pattern, in a particular orientation, located at a particular place in the unit cell. Then the prior knowledge about the electron density distribution in the motif can be used in just the same way as the knowledge about the electron density in the solvent or protein regions of the unit cell. At each point within and in the immediate vicinity of this motif a probability distribution for plausible values of electron density is constructed using model values of electron density for a helix along with Eq. (20). Then these probability distributions are used in a local log-likelihood function that is an extension of Eq. (17):

$$LL(\rho(x, \{F_h\})) = \ln[p(\rho(x)|\text{PROT})p_{PROT}(x) + p(\rho(x)|\text{SOLV})p_{SOLV}(x) + p(\rho(x)|H)p_H(x)], \qquad \text{Eq. (23)}$$

where $p_H(x)$ refers to the probability that there is a structural motif at a known location, with a known orientation, somewhere near the point x, and $p(\rho(x)|H)$ is the probability distribution for electron density at this point given that this motif actually is present.

An exemplary structural motif is a helical structure. There is nothing special about helices (other than their relative regularity), and helices serve to illustrate the features of the present invention. The significance of Eq. 23 is that it provides a way to incorporate pattern recognition (the probability that there is a helix with this orientation at this point) into density modification. If the pattern to be detected involves a large part of the map, then it might be identifiable even when errors in the map are very large. Then, if the pattern is well-defined, the last term in Eq. (23) can potentially contribute very substantially to the local log-likelihood function and, therefore, to density modification.

The formulation in Eq. 23 essentially segments the map into points within protein, within solvent, and within another pattern (helix) of electron density. Strictly speaking, these categories are not mutually exclusive as a point can be both within protein and within a helix. Furthermore, a particular point could be within more than one helix pattern, as the template used to identify a helix might be shorter than the actual helix and several overlapping patterns of helix might be recognized.

It is convenient, however, to use the most informative piece of information when there is either type of overlap. If a point is both within the protein region and within a helix, for example, the fact that it is within a helix is far more informative because it defines the electron density very precisely, while the fact that the point is within the protein only gives a very broad range for possible values of electron density. In practice, if more than one pattern has information about the electron density at a particular point, then the pattern that has the highest probability is used. Then the probabilities that the point is in protein or solvent are modified from earlier expressions by normalizing their total to simply be whatever the probability is that the point is not in this pattern.

Image Reconstruction by Template Matching

To make optimal use of Eq. (23), the probability is needed that a particular pattern of electron density (e.g., one corresponding to a helix) is located at each possible position and with each possible orientation in the unit cell. To make this practical, this estimation is separated into three steps. First, a template is constructed that is an average of the patterns of electron density found in many instances where it occurs. Next, locations and orientations of a template (such as the electron density for a helix) that match the electron density in the map to some degree are identified. Then the probabilities of these possibilities are estimated.

Construction of a Template for a Helix

Although helices are relatively regular secondary structures, there is some variation from one to another in the precise locations of atoms and in their thermal factors. Even more importantly, the side chains in one helix may be completely different than those in another helix. Consequently construction of a template that has average features is useful for the purpose of pattern matching. Additionally, it is helpful to have a point-by-point estimate of the standard deviation of this density that can be used to identify regions within the template that have more or less variation. A simple method is used to generate a template and standard deviation of the template for helices. Residues 133–138 of myoglobin (see Berman et al., The Protein Data Bank, Nucleic Acids Research 28:235–242 (2000) (PDB, entry IA6M) were chosen as a model helical segment. Then 326 segments of 6 amino acids from the largely-helical protein phycoerythrin (PDB entry ILIA) for which the N, C, $C_\alpha$, and O atoms could be superimposed on the corresponding atoms in the myoglobin helix with an r.m.s, deviation of 0.5 Å or less were used to generate an average template for α-helices.

The template was constructed by superimposing each 6-amino acid helical segment of phycoerythrin on the myoglobin helix and calculating an electron density map at a resolution of 3 Å based on all atoms of the phycoerythrin structure that fell inside a 20 Å cube with the helix at the center. The resulting electron density within 2.5 Å of an atom in the myoglobin helix was averaged to yield an exemplary helical template. The average density in the template region was adjusted to a value of zero, and all points outside the template region were set to values of zero. At the same time, the standard deviation of electron density at each of the same set of points was determined.

Figure 4:
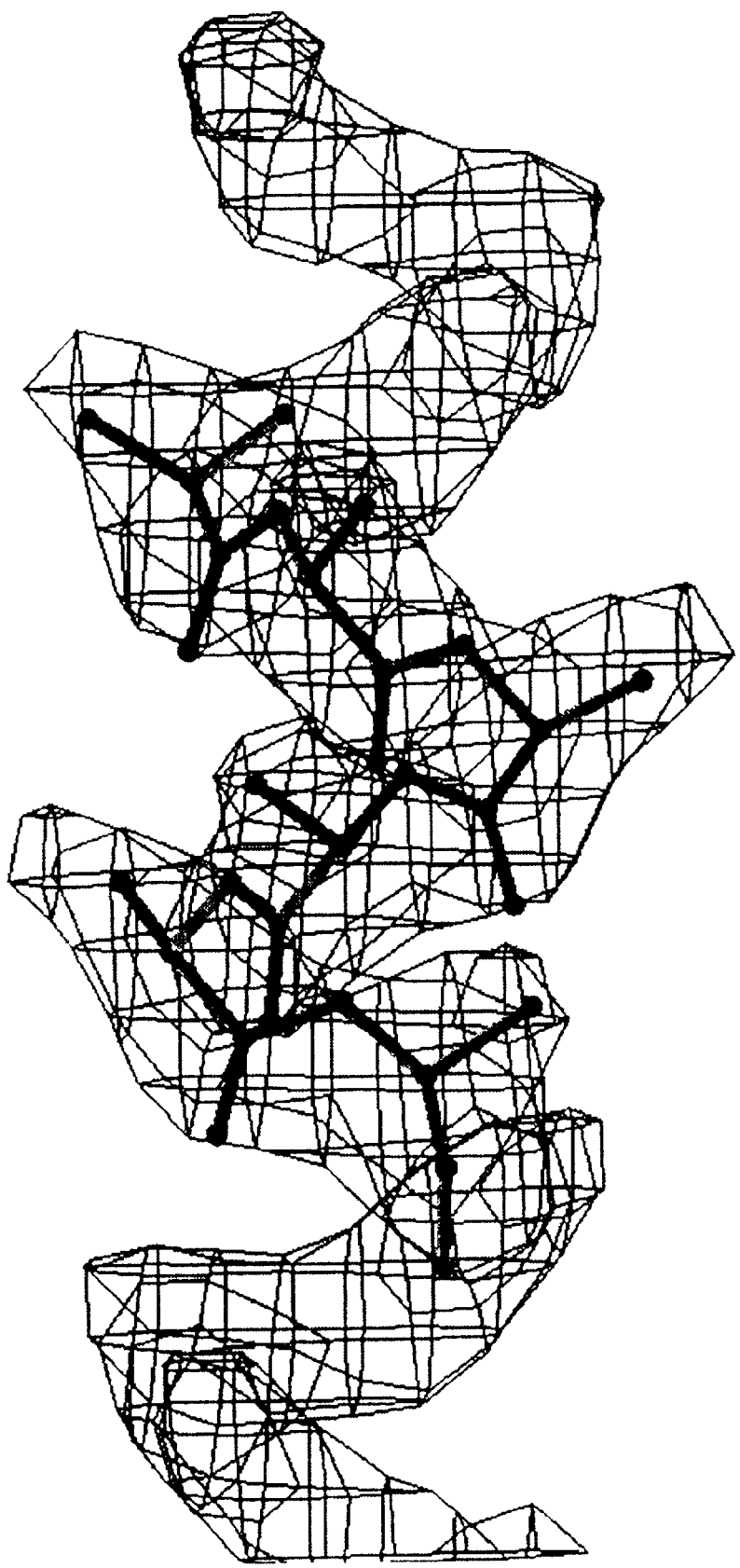
FIG. 4 is an exemplary template of an electron density map.

FIG. 4 shows the resulting helical template. The positions of $C_\beta$ atoms are visible but all further side-chain atoms are sufficiently different at different positions that no density is visible. As most helical segments containing 6 amino acids are in the middle of longer helices, the template extends beyond the ends of the model used to define it. For image reconstruction, only points within 2.5 Å of an atom in the model were used, however.

Matching a Helix Template to an Electron Density Map

An FFT-based convolution method was used to identify rotations and translations of the helix template that match the electron density in a map to some degree in an extension of earlier methods for pattern matching in electron density maps. The helix template was rotated in real-space and placed at the origin of a unit cell with dimensions identical to the map to be searched. Structure factors for the rotated template were calculated in space group P1 and the convolution of the template and the electron density map was calculated using an FFT. Each point in this convolution corresponds to a translation of the rotated template. The value of the convolution at each point is essentially the integral over the template region of the density in the rotated, translated template, multiplied by the density in the map. This product is expected to be high if the rotated, translated template has a high correspondence to the map and low otherwise.

In implementation of a helix search according to the present invention, the template is rotated in increments of 10° over three rotation axes. As the α-helix template is essentially symmetric when rotated 100° about its axis, and translated along its axis, the search only included 100° of rotation about the helix axis.

To identify peaks in this search that are reasonably likely to correspond to actual helical segments in the electron density map, a height cutoff was calculated such that in a random map only about one peak would be chosen every other rotation. The cutoff was estimated from the number of reflections (an estimate of the number of degrees of freedom in the map), the mean and standard deviation of the convolution function. Typically the cutoff was in the range of 3σ to 4σ, and typically about 200 to 2000 peaks were saved. In cases where there are templates with center-to-center distances of less than 2 Å, the one with the higher peak height was chosen.

Once matches of template-to-map are identified in this fashion, the rotation and translation parameters are refined by minimizing the residual error in the fit between the map and the template. This residual error $\sigma_{RESID}$ is estimated from the r.m.s. difference $\sigma_{FIT}$ between the map and the template (after multiplying the template by a scale factor α and adding an adjustable offset) and the uncertainty in the template itself $\sigma_H$ (based on the variability in electron densities for model helices):

$$\sigma_{RESID}^2 = \sigma_{FIT}^2 - (\alpha\sigma_H)^2 \qquad \text{Eq. (24)}$$

Estimating Probabilities of Matches of a Template to a Map

In the scheme described by Eq. (23) for incorporating information about patterns of electron density in a map, an estimate of the probability $p_H$ is needed that a template is actually located at a particular position and with a particular orientation. The convolution-based search used here to identify plausible matches is not entirely suitable for this purpose because the peak heights are just a measure of how good the match is, not how likely it is that this pattern really is located there. To see the difference, consider a case where it is known somehow that there are no helices of 6 amino acids in length in a particular protein, but where there is a stretch of 3 amino acids in an α-helical conformation. A convolution-based search might show a large peak corresponding to overlap of a 6 amino acid-long template and these 3 amino acids, yet only part of the template pattern is really present. In this example, it might be reasonable to say that there is a 50% chance that any given point in the template is a good description of the true electron density in the map, but not to say that this chance is 100%. Additionally, it is well known that the convolution is not the best discriminator of the location of a pattern in an image.

A combination of prior knowledge of the helical content of the protein in the crystal and the correlation coefficient of each match of template to map is used to estimate the probability that each match correctly identifies a region of the map with this pattern of electron density. First, the mean ($\overline{CC}$) and standard deviation ($\sigma_{CC}$) of correlation coefficients were determined for randomly-chosen template orientations and translations. This allows an estimate for each match of template to map of the probability $p(CC_{OBS}|notH)$ that this match with a correlation coefficient of $CC_{OBS}$ would have occurred entirely by chance (that is, if there were no helical pattern at this location):

$$p(CC_{OBS}|notH) \propto \exp - \frac{(CC_{OBS} - \overline{CC})^2}{2\sigma_{CC}^2} \qquad \text{Eq. (25)}$$

Next, the number of templates that are likely to be needed to describe all the helical regions in the unit cell are estimated. This is necessarily rather approximate both because the number of residues in helical conformation is not ordinarily known very accurately and because in the present method the templates describing a helix can overlap. Using the prior knowledge of the fraction $f_H$ of the macromolecule that is in a helical combination and of the fraction $f_{PROT}$ of the unit cell that is occupied by macromolecule, the cell volume V, and the template volume $V_{template}$, and using the empirical observations that about 70% ($f_{template}$) of the volume in a model helical protein is within a corresponding helical template and that only about 35% ($f_{unique}$) of each template does not overlap with another template, one can write that, $$N_{Template} \approx \frac{f_H f_{PROT} f_{Template} V}{f_{unique} V_{Template}} \qquad \text{Eq. (26)}$$

Now the relative probability $p(H|CC_{OBS})$ is estimated that each template match, with correlation coefficient $CC_{OBS}$, is at least partially correct (that is, it does not arise by chance):

$$p(H|CC_{OBS}) = \qquad \text{Eq. (27)}$$
$$\frac{p_o(H)p(CC_{OBS}|H)}{p_o(H)p(CC_{OBS}|H) + p_o(notH)p(CC_{OBS}|notH)}$$

where $p_o(H)$ and $p_o(notH)$ are the a priori probabilities that there is or is not a helix located at this position and orientation, and $p(CC_{OBS}|H)$ and $p(CC_{OBS}|notH)$ are the probabilities that this correlation coefficient would be found for correct and incorrect matches, respectively. As the vast majority of locations and orientations do not correspond to a correct match, it is reasonably assumed that $p_o(notH) \approx 1$. Additionally, as only the highest peaks in the convolution are considered, it is reasonable to assume that correct matches could have led to any of the peak heights observed, so that $p(CC_{OBS}|H) \approx 1$. Since Eq. (25) is an expression for $p(CC_{OBS}|notH)$, the only unknown term in Eq. (27) is $p_o(H)$, the a prori probability that there is a helix in this position and orientation. The term $p_o(H)$ is estimated by adjusting it so that the total number of templates is equal to $N_{Template}$ (Eqs. (25)–(27)):

$$N_{Template} = \sum_{templates} p(H|CC_{OBS}), \qquad \text{Eq. (28)}$$

where the probability that each template match is at least partially correct is, $$p(H|CC_{OBS}) \approx \frac{p_o(H)}{p_o(H) + \exp - \frac{(CC_{OBS} - \overline{CC})^2}{2\sigma_{CC}^2}} \qquad \text{Eq. (29)}$$

Although all possible matches with all levels of probability might ideally be included in the image reconstruction process, in practice only the most probable ones are found to contribute in a useful way. Consequently only template matches with a value $p(H|CC_{OBS})>0.8$ are included.

Finally, as discussed above there may be many cases where part of the template matches a pattern in the map but another part does not. The fraction that matches the pattern ($f_{match}$) is estimated based on the ratio of the correlation coefficient for each match ($CC_{OBS}$) to the highest correlation coefficient for any match in the map ($CC_{MAX}$):

$$f_{match} \approx \frac{CC_{OBS}}{CC_{MAX}} \qquad \text{Eq. (30)}$$

Using Eq. (29) along with the average helix template and its standard deviation, the new terms in Eq. (23) can be evaluated. The probability $p_{H(x)}$ that there is a helix at a particular location and orientation that contributes some information about the electron density at point x is given by, $$p_{H(x)} = f_{match} p(H|CC_{OBS}), \qquad \text{Eq. (31)}$$

where the probability that this template match is at least partially correct is $p(H|CC_{OBS})$ (Eq. (29)), the estimated fraction of the template that is involved in the match is $f_{match}$, and where H refers to a template match that overlaps the point x. The probability distribution for electron density at x is given by Eq. (20), where the ideal electron density distribution $p(\rho_T)$ is based on the mean $\rho_{Template}$ and standard deviation $\sigma_{Template}$ of the rotated, translated template at the point x, $$p(\rho_T) \approx \exp - \frac{(\rho_T - \beta \rho_{Template})^2}{2\sigma_{Template}^2} \qquad \text{Eq. (32)}$$

The process discussed above is more particularly shown in FIGS. 1, 2, and 3. The basic process of maximum-likelihood density modification has two parts. In the first part, the characteristics of model electron density map(s) are obtained (FIGS. 1 and 3). These will typically be the same or similar for many different applications of the algorithm. In the second part (FIG. 2), a particular set of structure factors has typically been obtained using experimental measurements on a crystal. This set of structure factors can be directly used to calculate an electron density map. Due to uncertainties in measurement, the electron density map is imperfect. In this second part, a set of structure factors (phases and amplitudes) is found that is consistent with experimental measurements of those structure factors, and that, when used to calculate an electron density map, leads to an electron density that has characteristics similar to those obtained from the model electron density map(s). A likelihood-based approach is used to find this optimal set of structure factors.

FIG. 1 shows a process for obtaining characteristics from model electron density maps to use in the above equations. First, a model protein structure obtained by X-ray crystallography is chosen 10. The model is used to conventionally calculate an electron density map 12. The electron density map is segmented into "protein" and "solvent" regions 14, along with regions containing structural motifs, where the protein region contains all points within a selected proximity to an atom in the model. Histograms of electron density are obtained 16 for "protein" and "solvent" regions. For protein and solvent regions, coefficients for the Gaussian function formed by Eq. (21) are found so that Eq. (21) is optimally fitted 18 to the histogram for that region. Eq. (21), with the fitted coefficients, is output 22 as the analytical description of the electron density distribution in the protein or solvent region for this model structure.

Figure 2:
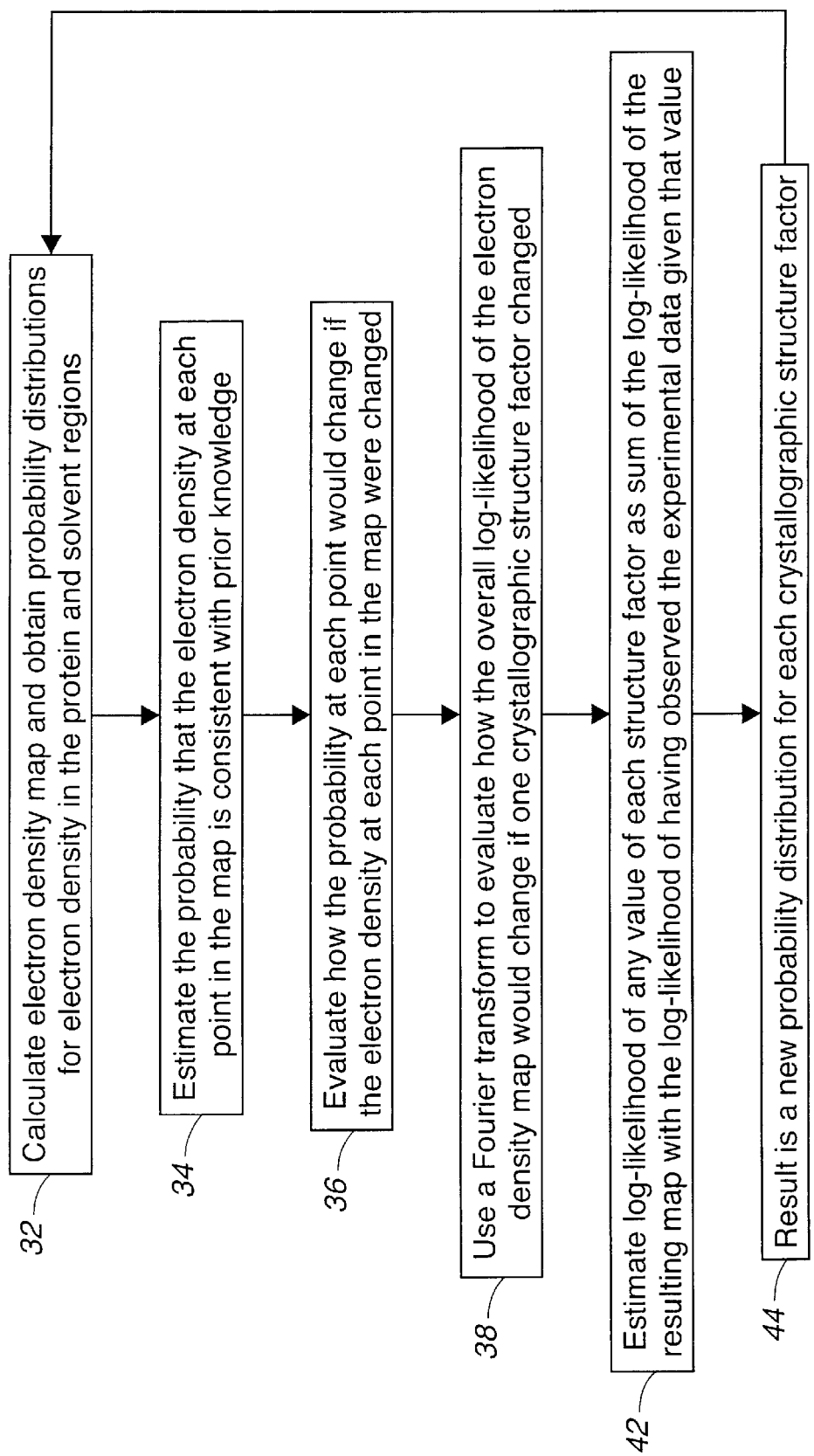
FIG. 2 is a flow sheet for a process to derive structure factors consistent with experimental results that result in an electron density map with expected characteristics.
Figure 3:
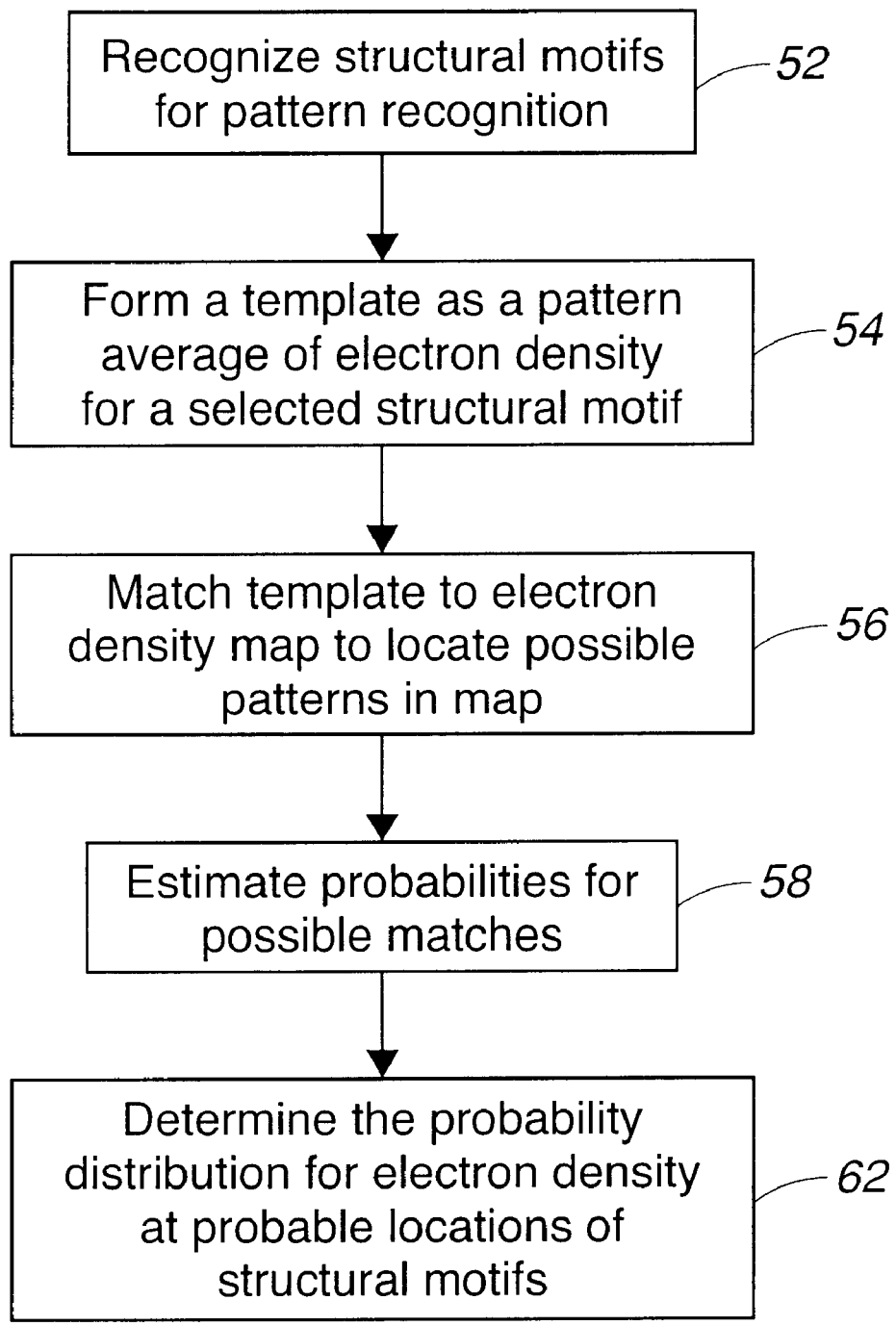
FIG. 3 is a flow sheet for a process to identify patterns in an electron density map that match a template and to associate probabilities with the identified patterns.

FIG. 2 depicts the process for finding the optimal set of structure factors for a crystal consistent with experimental measurements and resulting in an the electron density map having characteristics expected from the model structure and other known motifs, such as helices. The inputs are (1) the analytical descriptions of electron density distributions (Eq. 21) for model solvent and protein regions output 22 from the process shown in FIG. 1; (2) the fraction $f_{solvent}$ of the crystal that is in the "solvent" region; (3) the space group and cell parameters of the crystal; and (4) the experimental measurements of structure factors (phases and amplitudes) and their associated uncertainties.

The overall process steps for estimating the probability that the electron density at each point in the map is correct are: (1) obtaining probability distributions for electron density for the protein and solvent regions of the current electron density map; (2) estimating the probability that the electron density at each point in the map is correct; (3) evaluating how the probabilities would change if the electron density at each point in the map changed; (4) using a Fourier Transform to evaluate how the overall likelihood of the electron density map would change if one crystallographic structure factor changed; (5) combining the likelihood of the map with the likelihood of having observed the experimental data, as a function of each crystallographic structure factor; and (6) deriving a new probability distribution for each crystallographic structure factor. Steps (1) through (6) are then iterated until no substantial further changes in structure factors are obtained.

The process for finding structure factors that are consistent with experiments and that result in an electron density map with expected characteristics is shown in FIG. 2. The current best estimates of structure factors are used to calculate 32 an electron density map. If there is uncertainty in amplitude or phase, the weighted mean structure factor is ordinarily used, where all possible amplitudes and phases are weighted by their relative probabilities. The electron density map is segmented into protein and solvent regions as described by Wang, Methods Enzymol. 115, pp.90–112 (1985) and Leslie, Proceedings of the Study Weekend organized by CCP4, p. 25–32 (1988), incorporated by reference. The analytical descriptions of electron density distributions for model protein and solvent regions are fitted by least-squares to the observed electron density distributions in the protein and solvent regions in this electron density map using the factors $\beta$ and $\sigma_{map}^2$, where the same values of $\beta$ and $\sigma_{map}^2$ are used for both protein and solvent regions.

Eq. (22), with the values of coefficients $c_k$, $\sigma_k^2$, and $w_k$ for protein and solvent regions obtained from fitting Eq. (21) to the model electron density from the process shown in FIG. 1, and with the values of $\beta$ and $\sigma_{map}^2$ obtained above, now is an analytical description of a probability distribution for electron density in protein or solvent regions of the electron density map. The derivatives of Eq. (22) with respect to electron density ($\rho$) are obtained by standard procedures.

The probability of the electron density at each point in the protein or solvent regions of the current map is obtained 34 from Eq. (22). The logarithm of the overall log-likelihood of this map is calculated from the sum of the logarithms of these probabilities. The first and second derivatives with respect to electron density of the probability distributions for each point are calculated 36 to evaluate how the probability at each point would change if the electron density at each point in the map were changed.

An FFT is used to calculate 38, for each structure factor, how the overall log-likelihood of the map would change if that structure factor were changed. Then, the log-likelihood of the map as a function of all possible values of each structure factor is estimated 42 from a Taylor's series expansion of the log-likelihood of the map. This provides a log-likelihood estimate of any value of each structure factor as the sum of the log-likelihood of the resulting map with the log-likelihood of having observed the experimental data given that value.

The new estimate 44 of the logarithm of the probability that a structure factor has a particular value is obtained by adding together the log-likelihood of the map for that value of the structure factor and the log-likelihood of observing the experimental value of the structure factor. The exponentiation of these values is the probability of each possible value of a structure factor and is used to obtain a new weighted estimate of the structure factor. The new estimate of the structure factor is then returned to step 32 to begin a new iteration with a revised electron density map.

In accordance with the present invention, in the step 34 of the process shown in FIG. 2, a structural motif is selected to further input known information about electron density distribution, as further shown in FIG. 3. First, a structural motif appropriate to the structure being evaluated is selected 52. A template is formed 54 that is representative of the selected motif and is preferably formed from an average of the motif structure that may be found in many instances where it occurs. The template is then used to search the initial electron density map to locate possible matches 56 with the template. The probability that a match has been found is estimated 58 to verify that the pattern location is not just by chance. The most probable matches are selected and the probability of the electron density distribution at that location is then determined 62 for input to the density modification process.

Application to Density Modification of a Map of an
α-Helical Protein

The pattern-matching approach to density modification of the present invention was tested using the armadillo repeat region of β-catenin, which is largely α-helical (Huber et al., 1997). This structure was solved using MAD phasing on 15 selenium atoms incorporated into methionine residues in the protein. To make the test suitably difficult, only 3 of the 15 selenium atoms was used in calculating initial phases. As expected, this led to a very noisy map. The correlation coefficient of this map with a map calculated using phases from the refined model of only 0.33 FIG. (2). Real-space density modification was done using dm (Cowtan & Main, Acta Cryst. D52, pp. 43–48 (1996)), resulting in some improvement of the map, but a correlation coefficient of only 0.53.

The maximum-likelihood density modification approach of the '962 application (without any pattern recognition) resulted in a substantial improvement in the map, with a correlation coefficient of 0.62.

It is useful to visualize the portions of the electron density map where helical patterns were recognized by the present procedure. Most of the residues in an α-helical conformation were recognized and fit to a template, but several breaks were present. The density in the templates is a fairly good, but not perfect match, to the refined atomic model. The maximum-likelihood density modification with pattern recognition of helices improved the map even more substantially than maximum-likelihood density modification alone, with an overall correlation coefficient of 0.67. This density-modified map is of a sufficiently high quality that a model could be readily built into it, yet it is derived using phases based on just 3 selenium atoms in 700 amino acid residues, or one per 230 residues.

The method was tested further by using just one of the 15 selenium atoms in the β-catenin structure for phasing. In this case, the starting map was exceptionally noisy and had a correlation coefficient to the model map of just 0.24. Real-space density modification with dm result in only a small improvement of the map, leading to a correlation coefficient of 0.30. Nevertheless some helices could be recognized and maximum-likelihood density modification with pattern recognition yielded a final map that was interpretable in many regions and had a correlation coefficient to the model map of 0.51. As helical templates were used to improve the density, the modified map has some regions that are very clear and others that have very little density.

Discussion

The density-modification procedures developed here contain two fundamental changes from methods in general use. One is the use of optimization of a likelihood function rather than phase recombination between experimental and modified maps. The second is the use of a log-likelihood function for a map. The optimization of a likelihood function (Eq. (3)) is important because it places density modification on a sound statistical foundation. In the present case, it also eliminates difficulties in weighting of experimental and modified phases. This optimization is made practical by the approaches that have been developed involving reciprocal-space calculations of derivatives of the likelihood function with respect to structure factors.

Somoza et al (1995) showed previously that optimization of a target function that includes the differences between model electron density and a target electron density in regions of the unit cell (such as solvent regions) where the electron density is known, can accomplish the same function as conventional solvent flattening procedures. The present invention extends this by developing the concept of a map likelihood function, showing how a map likelihood function can be calculated, and showing how optimizing a combined likelihood function that consists of the map likelihood function, an experimental likelihood function, and any a priori information can be used to obtain crystallographic phase information. The present invention also carries out the optimization process with respect to crystallographic phases, rather than electron density, and through the use of derivatives of the log likelihood function with respect to crystallographic structure factors, rather than through solving a linear system of equations as done by Somoza et al (1995).

The map likelihood function is a statement of the plausibility of an electron density map calculated from some set of structure factors. The plausibility can include any information about patterns of electron density that are expected and not expected. The implementation of the likelihood function for a map (Eq. 4) is a simplified version in which each point in the map is treated independently. The overall log-likelihood of the map is the integral over the unit cell of the local map log-likelihood function.

The local log-likelihood function for a map can readily incorporate information about solvent, and protein regions in the map if they are identified by some means. After taking into consideration the noise in the map (Eq. (20)), the electron density at a point known to be in the solvent region is plausible only if it has values within a narrow range expected in the solvent. Similarly, the density at a point in the protein region is plausible only if it has a value in the somewhat greater range expected in the protein region.

The patterns of electron density that are included in the local log-likelihood function need not be as simple as the probability distribution for electron density in solvent or protein regions. They can include detailed information about the electron density in a region as well. Eq. (23) shows how to incorporate information on a pattern of density corresponding to a structural motif such as a fragment of α-helix. Any other fragment density information can be incorporated in a similar fashion.

It is important to recognize, as pointed out by Beran and Szoke (1995), that the use of partial-structure information in a likelihood function for a map is fundamentally different than using what may appear to be the same partial-structure information in a $\sigma_A$ or related model phase calculation (Read, 1997). The difference is that, in the $\sigma_A$ model phase calculation, the errors in the partial-structure information are assumed to be the same everywhere in the unit cell, while in the map likelihood approach, the approach of Beran and Szoke (1995), or the method of Somoza et al. (1995) the errors can be explicitly specified for each point in the map.

The difference can be best appreciated in an idealized case where only a small fragment of structure is missing from an otherwise perfect model, and a difference Fourier or similar calculation is carried out to identify the missing fragment. In the $\sigma_A$-weighted map, the difference density can be located anywhere in the map (though much will be in the correct region). In the map likelihood approach, the fact that the density is known exactly everywhere except in the region of the missing fragment is explicitly taken into account. Consequently in this approach all the difference density would be located in the region where the missing fragment is located.

In a more accessible case the same principle applies as well. In the examples described in this work, α-helices are identified in a map and used to improve phases. In the model phase calculation approach, the rotated, translated templates (or coordinates of atoms in a model helix) would be used to calculate model phases, and a $\sigma_A$-weighted combined phase map would be calculated. As in the more extreme example above, the uncertainties in electron density based on the model alone would be assumed to be distributed over the entire unit cell. In the map likelihood method, uncertainties in electron density are relatively low in the entire region of each helical template (where the model electron density is relatively well known), and higher elsewhere in the protein region (where it is poorly known), and once again lower in the solvent region (where it is very precisely known). This point-by-point specification of uncertainty in the map allows a much more complete use of the available information about the partial model than the model phase method.

The key to the use of the local log-likelihood function for a map is the specification of a probability distribution for the electron density for some subset of points in the map. It doesn't matter if this specification says that all the points in a region have the same electron density, or whether the points in this region have a particular pattern of electron density such as a part of a helix. Much the same amount of information is conveyed in either case, and essentially the same amount of improvement in phases or structure factors can potentially be obtained in either case.

Conclusions

The methods of the present invention provide a simple and practical way to incorporate prior knowledge of the electron density in a crystal structure into probability distributions for structure factors. The prior knowledge can range from the locations of solvent and protein regions to detailed information on a local pattern of electron density corresponding to a fragment of structure.

There are a number of important extensions of these approaches that can be readily envisioned. One is the incorporation of non-crystallographic symmetry information. Electron density information from one copy of a macromolecule in the asymmetric unit can be used in the present approach in the same way as other partial structure information. The ability to specify separate probability distributions for electron density at each point in the map will make it possible to take into account the different amounts of error in different parts of the partial model. In that way, the parts that are most similar can effectively be weighted more strongly and the parts that are more different be weighted less strongly, a property that is more difficult to achieve with current methods. The same approach could be used to combine information on electron density from more than one crystal form as well.

A second is in the area of molecular replacement. The calculation of phases from a partial model is currently problematic due to model bias. The ability to specify, on a point-by-point basis, the uncertainties in a model could substantially improve the quality of phasing that can be obtained. A third is in automated model building. The approach described here for identification of α-helices and incorporation of model information into density modification is essentially the first step in automated model-building.

A fourth and somewhat speculative possibility is that the use of the present approach in ab initio phasing of macromolecular structures. As pointed out above, the information content in the statement that a particular region of the unit cell is solvent is nearly the same as the statement that the region contains an α-helix. This is despite the fact that a model-phased map would be essentially noise in the solvent case and would contain significant information in the case of the helix. The importance is that the formulation of the present invention allows the use of any information about the local probability distribution for electron density, even distributions that are completely uniform. This observation leads to the possibility of guessing that a particular region of the unit cell is contained in the solvent, and using the resulting phase information as the starting point for interactive phase improvement using the methods described here. This possibility is especially intriguing because a solvent area has no internal structure so that, in searching for a suitable location, the exact location is not crucial and rotation of at least a spherical template would have no effect. Consequently only a very small number of positions in the unit cell would have to be searched. There is the possibility that the unit cell could be exhaustively tested for solvent regions that lead to enough phase information whereby a model can eventually be built up by an iterative application of the methods described here.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for modifying an electron density map of an experimental crystallographic structure having protein regions and solvent regions to increase a likelihood function that an electron density map derived from experimentally observed structure factors for the experimental crystallographic structure represents the experimental crystallographic structure comprising:

(a) obtaining x-ray data from the experimental crystallographic structure;

(b) processing the x-ray data to output a first set of structure factors for the experimental crystallographic structure and a concomitant first experimental electron density map;

(c) selecting a model crystallographic structure having known crystal structure model information;

(d) processing the model information to output a model electron density map and model probability distributions for true electron density over protein and solvent regions of the model electron density map;

(e) selecting at least one structural motif that may be associated with the experimental crystallographic structure and processing the structural motif to output a motif template electron density map for the at least one structural motif;

(f) searching the first experimental electron density map to locate probable matches with the template electron density map;

(g) selecting at least one structural motif that has a probable match within the first experimental electron density map, processing the at least one structural motif to output a motif probability distribution for true electron density within the at least one structural motif, and combining the motif probability distribution with the model probability distribution to provide a combined model electron density map with a combined model electron probability distribution for each of the protein regions and the solvent regions;

(h) estimating probabilities from the combined model electron probability distribution that each point in the first experimental electron density map represents the experimental crystallographic structure;

(i) evaluating how the probabilities of step (h) would change if electron density at each point in the first experimental electron density map changes:

(j) evaluating how an overall log-likelihood of the first experimental electron density map changes for a change in each experimental structure factor value;

(k) estimating a log-likelihood of any value of each structure factor as a sum of a log-likelihood of the combined model electron density map and a log-likelihood of having observed the experimental data given that value of each structure factor to provide a new probability distribution for each experimental crystallographic structure factor to form a new set of experimental structure factors and a concomitant updated experimental electron density map;

(l) repeating steps (h)–(k), where the first experimental electron density map is the updated experimental electron density map, until no further changes occur in values for the experimental structure factors to form a set of final experimental structure factors; and (m) forming a modified experimental electron density map from the set of final experimental structure factors.

2. The method of claim 1, wherein the steps of (g) and (h) further include:

separating the model electron density map into model protein regions and model solvent regions;

forming a histogram over each model protein region and solvent region and over each selected structural motif template electron density map to form separate probability functions of electron density at each point in electron density maps of model protein regions, model solvent regions and template regions, each having a set of Gaussian fitting coefficients;

applying the set of Gaussian fitting coefficients to regions of the first experimental electron density map to obtain a probability distribution for electron density at each point in the first experimental map from histograms of protein regions, solvent regions, and structural motif regions identified for the first experimental map.

3. The method of claim 1, wherein the step of outputting a motif template electron density map for a selected structural motif includes:

selecting a model motif segment from a data bank of known motif segments;

forming an electron density map for the model motif segment;

calculating average electron densities within a selected distance from atoms in the model motif segment to yield an exemplary electron density map motif template;

adjusting the average electron density over the motif template region to a value of zero; and determining a standard deviation for electron density at each point in the motif template electron density map.

4. The method of claim 1, wherein the step of selecting the at least one structural motif that has a probable match within the experimental electron density map includes:

rotating the motif template to a starting rotation and calculating structure factors for the rotated motif template and aligning the motif template within the experimental electron density map;

determining a first value for a convolution of the rotated motif template and the experimental electron density map using a FFT (Fast Fourier Transform);

rotating the motif template to a new rotation and forming a second value for the convolution of the motif template template and the experimental electron density map;

continuing to rotate the motif template and forming successive values for the convolution of the motif template template and the experimental electron density map; and placing the motif template at successive locations in the experimental electron density to identify peak values for the convolution of the motif template within the experimental electron density map that indicate the presence of the at least one structural motif in the experimental electron density map.

5. The method of claim 4, further including estimating the probability that each structural motif having an indicated presence in the experimental electron density map properly identifies a region of the experimental electron density map with that structural motif and selecting only the structural motifs with the highest probabilities to add to the model probability distribution to form the combined model electron probability distribution.

* * * * *